(12) United States Patent
Ruegamer et al.

(10) Patent No.: US 8,306,154 B2
(45) Date of Patent: Nov. 6, 2012

(54) MULTI-FREQUENCY BAND RECEIVER

(75) Inventors: Alexander Ruegamer, Obernbreit (DE); Santiago Urquijo Tardio, Erlangen (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 6 days.

(21) Appl. No.: 12/959,189

(22) Filed: Dec. 2, 2010

(65) Prior Publication Data
US 2011/0128999 A1    Jun. 2, 2011

Related U.S. Application Data

(63) Continuation of application No. PCT/EP2009/003874, filed on May 29, 2009.

(30) Foreign Application Priority Data

Jun. 4, 2008  (DE) .......................... 10 2008 026 698

(51) Int. Cl.
*H03K 9/00* (2006.01)
*H04L 27/00* (2006.01)

(52) U.S. Cl. .................... 375/316; 375/350; 455/168.1; 342/350

(58) Field of Classification Search .................. 375/316, 375/349; 455/168.1, 188.1, 189.1, 313, 314; 342/362, 350
See application file for complete search history.

(56) References Cited

U.S. PATENT DOCUMENTS

| | | | |
|---|---|---|---|
| 3,940,697 A * | 2/1976 | Morgan ..................... | 455/168.1 |
| 5,280,636 A * | 1/1994 | Kelley et al. ................. | 455/131 |
| 6,029,052 A * | 2/2000 | Isberg et al. ................. | 455/131 |
| 6,038,248 A | 3/2000 | Rabaeijs et al. | |
| 6,175,746 B1 * | 1/2001 | Nakayama et al. ......... | 455/552.1 |
| 6,332,083 B1 * | 12/2001 | Shi et al. ..................... | 455/552.1 |
| 6,466,768 B1 * | 10/2002 | Agahi-Kesheh et al. ....... | 455/78 |

(Continued)

FOREIGN PATENT DOCUMENTS
CA      2542702      10/2006
(Continued)

OTHER PUBLICATIONS

Akos et al: "A Prototyping Platform for Multi-Frequency GNSS Receivers"; Sep. 9-12, 2003; ION GPS/GNSS 2003, pp. 117-128, XP002545261, Portland, U.S.A.

(Continued)

*Primary Examiner* — Jean B Corrielus
(74) *Attorney, Agent, or Firm* — Michael A. Glenn; Glenn Patent Group

(57) ABSTRACT

A multi-frequency band receiver has a first path configured to process first and second frequency bands, and a second path configured to process a third frequency band, the first and second frequency bands having a smaller distance than the first and third frequency bands, and having a smaller distance than the second and third frequency bands. In addition, the multi-frequency band receiver has an oscillator stage for providing a local oscillator signal having a frequency that is between the center frequencies of the first and second frequency bands, the first path having a mixer that may be supplied with the local oscillator signal, and the second path having a mixer that may also be supplied with the local oscillator signal. In addition, the multi-frequency band receiver has a baseband stage for processing output signals of the first and second paths so as to obtain a receive signal.

21 Claims, 10 Drawing Sheets

U.S. PATENT DOCUMENTS

| | | | |
|---|---|---|---|
| 6,584,304 B1* | 6/2003 | Thomsen et al. | 455/188.1 |
| 7,092,676 B2* | 8/2006 | Abdelgany et al. | 455/76 |
| 7,155,252 B2* | 12/2006 | Martin et al. | 455/553.1 |
| 7,260,416 B2* | 8/2007 | Shippee | 455/552.1 |
| 7,333,053 B2* | 2/2008 | Lawrence et al. | 342/357.72 |
| 7,333,565 B2* | 2/2008 | Oono et al. | 375/307 |
| 7,333,831 B2* | 2/2008 | Srinivasan et al. | 455/552.1 |
| 7,532,871 B2* | 5/2009 | Nishimura et al. | 455/130 |
| 7,672,689 B2* | 3/2010 | Khlat et al. | 455/552.1 |
| 7,680,477 B2* | 3/2010 | Yanduru et al. | 455/340 |
| 8,073,500 B2* | 12/2011 | Chang et al. | 455/574 |
| 2005/0227631 A1* | 10/2005 | Robinett | 455/83 |
| 2005/0266806 A1* | 12/2005 | Soe et al. | 455/88 |
| 2006/0178122 A1* | 8/2006 | Srinivasan et al. | 455/168.1 |
| 2006/0276149 A1* | 12/2006 | Womac et al. | 455/133 |
| 2007/0096980 A1 | 5/2007 | Gradincic et al. | |
| 2007/0159385 A1 | 7/2007 | Lawrence | |
| 2007/0298750 A1* | 12/2007 | Masuda | 455/323 |
| 2010/0048157 A1 | 2/2010 | Carrera et al. | |

FOREIGN PATENT DOCUMENTS

| | | |
|---|---|---|
| DE | 102006029482 | 1/2008 |
| WO | WO01/39364 | 5/2001 |
| WO | WO2006/038050 | 4/2006 |
| WO | WO2006/085255 | 8/2006 |
| WO | WO2008/000383 | 1/2008 |

OTHER PUBLICATIONS

Marradi et al: "The Galileo Ground Segment Reference Receiver Development: Architecture and Critical Design Issues"; Sep. 9-12, 2003; ION GPS/GNSS 2003, pp. 1929-1940, XP002545256, Portland, U.S.A.

Pizzarulli et al: "Reconfigurable and simultaneous dual band Galileo/GPS front-end receiver in 0.13µm RFCMOS"; May 5-8, 2008; Position, Location and Navigation Symposium, 2008 IEEE/ION, 2008, pp. 846-850.

* cited by examiner

MULTI-FREQUENCY BAND RECEIVER

CROSS-REFERENCE TO RELATED APPLICATIONS

This application is a Continuation of PCT Patent Application No. PCT/EP2009/003874 filed 29 May 2009, and claims priority to German Patent Application Serial No. 102008026698.1-35 filed 4 Jun. 2008, which are incorporated herein in their entirety by this reference thereto.

BACKGROUND OF THE INVENTION

Embodiments in accordance with the invention relate to wireless data communication, and in particular to a multi-frequency band receiver and to a method of receiving signals using a multi-frequency band receiver.

Feasible input architectures, or front-end architectures (front end: input-side component), for Global Navigation Satellite System receivers (GNSS receivers) are designed to only receive one frequency band in each case. However, for high-precision GNSS receivers, it is precisely the reception of several frequency bands that is of vital importance, since it is only in this manner that inaccuracies due to ionospheric effects, for example, may be subtracted out.

With input stages, or front ends, for GNSS multi-frequency band receivers, the individual frequency bands are currently processed separately. Thus, an individual input stage or an individual front end may be used for each frequency band. This often also entails that a specific baseband stage and a specific oscillator stage may be used for each frequency band. Consequently, a large number of components and, therefore, a large amount of space may be used. Likewise, the current consumption of the input stages of the different frequency bands add up considerably, which is often critical, for example, for mobile satellite navigation receivers, but also in many other fields.

A single input stage that is sufficiently broadband for several frequency bands, or a sufficiently broadband front end, is very costly and may consume a large amount of current due to the high bandwidth. However, the high bandwidth is useful since the frequency bands are often spaced far apart. For example, in the "Galileo" GNSS, the E1 band is about 380 MHz above the E5a/b band. A bandwidth of about 430 MHz would be useful.

Processing of several frequency bands in only one broadband input stage not only strongly increases the current consumption, but the requirements placed upon the various components are also very high, since the components are designed for a broad frequency range.

Other approaches utilize an input architecture, or front-end architecture, that may be switched to other frequency bands as desired—however, this does not provide any advantage for ionosphere correction, for example, since for this purpose, at least two frequency bands may be available at the same time. Thus, for any applications requiring real-time information from several frequency bands, a switchable input architecture processing the various frequency bands one after the other is not useful.

US 2007/0096980 A1 shows an RF receiver for GNSS signals, consisting of a single chip and a small number of external components and having a number of independent signal paths, each path having a separate IF stage and baseband down converters. Each signal path is matched to a specific IF band by selection of an external IF filter. The local oscillator frequency lies in the center of all of the receiver's frequency bands to be processed.

In addition, CA 2542702 A1 shows a multi-band receiver for utilization in satellite distance systems.

WO 2006/038050 A1 shows a two-frequency receiver for signals having extensive spectra, a receive signal being received which comprises a first signal having a first frequency center and a second signal having a second frequency center. Processing is effected in one path.

In addition, U.S. Pat. No. 6,038,248 shows a method and a device for receiving and converting a signal having an extensive spectrum. Processing again is effected in one path.

WO 2008/000383 A1 shows a signal conditioner for processing a receive signal having a first useful frequency band and a second useful frequency band. Processing of the frequency bands is effected in one path.

In addition, WO 01/39364 A1 shows a multi-band receiver. Again, processing of the signals is effected only in one path.

Moreover, "Pizzarulli, A.; et al.: Reconfigurable and simultaneous dual band Galileo/GPS front-end receiver in 0.13 μm RFCMOS" shows a reconfigurable and simultaneous dual-band Galileo/GPS front-end receiver that was realized in 0.13 μm RFCMOS (Radio Frequency Complementary Metal Oxide Semiconductor) technology. The front end uses only one fixed PLL and a VCO having a superheterodyn architecture for down converting two RF (radio-frequency) signals to two IF (intermediate-frequency) signals within the range from 50 MHz to 150 MHz. L1 and E1 signals are converted directly within a channel with one mixer. L2, E6, E5, E5a, E5b signals are down converted by means of a double-stage (2 mixers) conversion.

DE 10 2006 029 482 A1 shows a receiver and a method of receiving a first useful frequency band and a second useful frequency band, the useful frequency bands being spaced apart from each other, and comprises a bandpass filter means for filtering one or more receive signals, said bandpass filter means being configured to provide a combination signal having the first useful frequency band and the second useful frequency band, or a first bandpass filter signal having the first useful frequency band, and a second bandpass filter signal having the second useful frequency band. The receiver further comprises a mixer means for converting the combination signal or the first bandpass filter signal and the second bandpass filter signal using a local oscillator signal whose frequency is selected such that the first useful frequency band and the second useful frequency band are, at least in part, mutual mirror bands with regard to the frequency of the local oscillator signal, so as to obtain a first intermediate-frequency signal and a second intermediate-frequency signal. In addition, the receiver has an intermediate-frequency filter means for filtering the first intermediate-frequency signal and the second intermediate-frequency signal so as to obtain a first filtered intermediate-frequency signal and a second filtered intermediate-frequency signal.

In addition, WO 2006/085255 A1 shows a receiver for simultaneously receiving various radio-frequency signals in accordance with various standards, said receiver comprising a first frequency conversion stage for converting the radio-frequency signal to a first intermediate-frequency signal, and comprising a second frequency conversion stage for converting the first intermediate-frequency signal to a second intermediate-frequency signal, and comprising a processing stage for retrieving first information from the first intermediate-frequency signal and second information from the second intermediate-frequency signal.

SUMMARY

According to an embodiment, a multi-frequency band receiver may have: a first path configured to process a first frequency band and a second frequency band; a second path configured to process a third frequency band, the first frequency band and the second frequency band exhibiting a smaller distance than the first frequency band and the third frequency band, and exhibiting a smaller distance than the second frequency band and the third frequency band; an oscillator stage for providing a local oscillator signal having a frequency that is between the center frequency of the first frequency band and the center frequency of the second frequency band (104), the first path including a mixer that may be supplied with the local oscillator signal, and the second path including a mixer that may also be supplied with the local oscillator signal; baseband stage for processing output signals of the first path and output signals of the second path so as to acquire a receive signal, wherein the first path has an in-phase output and a quadrature-phase output, wherein the second path has an in-phase output and a quadrature-phase output, and wherein the baseband stage has an in-phase input and a quadrature-phase input; and a combiner configured to superimpose a signal at the in-phase output of the first path and a signal at the in-phase output of the second path and to make said signal available to the baseband stage at the in-phase input, and the combiner being configured to superimpose a signal at the quadrature-phase output of the first path and a signal at the quadrature-phase output of the second path and to make said signal available to the baseband stage at the quadrature-phase input.

According to another embodiment, a satellite navigation receiver having a multi-frequency band receiver, which multi-frequency band receiver may have: a first path configured to process a first frequency band and a second frequency band; a second path configured to process a third frequency band, the first frequency band and the second frequency band exhibiting a smaller distance than the first frequency band and the third frequency band, and exhibiting a smaller distance than the second frequency band and the third frequency band; an oscillator stage for providing a local oscillator signal having a frequency that is between the center frequency of the first frequency band and the center frequency of the second frequency band (104), the first path including a mixer that may be supplied with the local oscillator signal, and the second path including a mixer that may also be supplied with the local oscillator signal; a baseband stage for processing output signals of the first path and output signals of the second path so as to acquire a receive signal, wherein the first path has an in-phase output and a quadrature-phase output, wherein the second path has an in-phase output and a quadrature-phase output, and wherein the baseband stage has an in-phase input and a quadrature-phase input; and a combiner configured to superimpose a signal at the in-phase output of the first path and a signal at the in-phase output of the second path and to make said signal available to the baseband stage at the in-phase input, and the combiner being configured to superimpose a signal at the quadrature-phase output of the first path and a signal at the quadrature-phase output of the second path and to make said signal available to the baseband stage at the quadrature-phase input.

According to another embodiment, a method of receiving signals using a multi-frequency band receiver may have the steps of: processing a first frequency band and a second frequency band in a first path; processing a third frequency band in a second path, the first frequency band and the second frequency band (104) exhibiting a smaller distance than the first frequency band and the third frequency band, and exhibiting a smaller distance than the second frequency band and the third frequency band; providing a local oscillator signal by an oscillator stage, said local oscillator signal having a frequency that lies between the center frequency of the first frequency band and the center frequency of the second frequency band (104), the local oscillator signal supplying a mixer in the first path and a mixer in the second path; and processing output signals of the first path and output signals of the second path so as to acquire a receive signal, wherein the first path has an in-phase output and a quadrature-phase output, wherein the second path has an in-phase output and a quadrature-phase output, and wherein the baseband stage has an in-phase input and a quadrature-phase input; superimposing a signal at the in-phase output of the first path and a signal at the in-phase output of the second path and making said signal available to the baseband stage at the in-phase input; and superimposing a signal at the quadrature-phase output of the first path and a signal at the quadrature-phase output of the second path and making said signal available to the baseband stage at the quadrature-phase input.

According to another embodiment, a computer program including a program code for performing the method of receiving signals using a multi-frequency band receiver, which method may have: processing a first frequency band and a second frequency band in a first path; processing a third frequency band in a second path, the first frequency band and the second frequency band (104) exhibiting a smaller distance than the first frequency band and the third frequency band, and exhibiting a smaller distance than the second frequency band and the third frequency band; providing a local oscillator signal by an oscillator stage, said local oscillator signal having a frequency that lies between the center frequency of the first frequency band and the center frequency of the second frequency band (104), the local oscillator signal supplying a mixer in the first path and a mixer in the second path; and processing output signals of the first path and output signals of the second path so as to acquire a receive signal, wherein the first path has an in-phase output and a quadrature-phase output, wherein the second path has an in-phase output and a quadrature-phase output, and wherein the baseband stage has an in-phase input and a quadrature-phase input; superimposing a signal at the in-phase output of the first path and a signal at the in-phase output of the second path and making said signal available to the baseband stage at the in-phase input; and superimposing a signal at the quadrature-phase output of the first path and a signal at the quadrature-phase output of the second path and making said signal available to the baseband stage at the quadrature-phase input, when the computer program runs on a computer or micro-controller.

One embodiment in accordance with the invention provides a multi-frequency band receiver comprising a first path adapted to process a first frequency band and a second frequency band, and a second path adapted to process a third frequency band. The first frequency band and the second frequency band have a smaller distance than the first frequency band and the third frequency band, and a smaller distance than the second frequency band and the third frequency band. In addition, the multi-frequency band receiver comprises an oscillator stage for providing a local oscillator signal having a frequency that is between the center frequency of the first frequency band and the center frequency of the second frequency band, the first path comprising a mixer that may be supplied with the local oscillator signal, and the second path having a mixer that may also be supplied with the local oscillator signal. A further feature of the multi-frequency band receiver is a baseband stage for processing output signals of the first path and of the second path in order to obtain a receive signal.

Embodiments in accordance with the invention are based on the core idea that more than two frequency bands are processed using one receiver, the number of paths in which different frequency bands are processed being smaller than the number of the frequency bands to be processed, and larger than 1. In this context, frequency bands having a small distance are processed in a shared path, and frequency bands having a large distance are processed in different paths.

In this manner, a middle course is selected between the described receivers which have only one processing path for all of the frequency bands and receivers which have one processing path for each frequency band.

By means of the inventive association of the frequency bands to be processed to separate or shared paths, depending on the mutual distances of the frequency bands, the number of components and, thus, also the space requirement may be reduced, which also directly leads to a cost reduction.

On the other hand, the current consumption is also reduced.

In addition, the requirements placed upon the components—as compared to a receiver having only one processing path for all of the frequency bands—may be reduced, since components having smaller bandwidths may be used for the individual paths, which also results in a cost reduction.

Moreover, by utilizing the same local oscillator signal in several paths, the number of oscillators that may be used, or the complexity of the oscillator stage, may be reduced, whereby even further components may be saved.

In some embodiments, for example mirror-frequency suppression will be omitted because of the matching of the local oscillator signal of the oscillator stage with the frequency bands processed in a shared path, since in this case, a frequency band will represent the mirror frequency of another frequency band. As a result, the complexity and, thus, the number of components that may be used may be reduced.

In some further embodiments, due to matching of the signals of the oscillator stage with the frequency bands to be processed, the receiver may make do with only one oscillator stage and with only one baseband stage, which leads to a reduction in the components that may be used, and therefore increases the efficiency with regard to space, cost and power consumption.

In some embodiments in accordance with the invention, at least two of the frequency bands processed in a shared path are modulated such that during processing of the signals, a highpass filter may suppress interference such as 1/f noise or a DC (direct voltage) offset.

Some embodiments in accordance with the invention comprise a combiner adapted to superimpose a signal at an output of the first path and a signal at an output of the second path, and to provide the superimposed signal to an input of the baseband stage. The signal at the output of the first path and the signal at the output of the second path are adapted such that information of the individual signals may be separated again despite the superposition. In this manner, the multi-frequency band receiver may be realized with only one baseband stage, for example.

Some embodiments in accordance with the invention enable simultaneous reception of three frequency bands while using a minimum number of components and only one single oscillator stage, or only one single frequency synthesizer, which enables integration and a compact and low-power design (architecture).

Some embodiments in accordance with the invention relate to an input architecture, or front-end architecture, for GNSS (Global Navigation Satellite System) multi-frequency band receivers.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
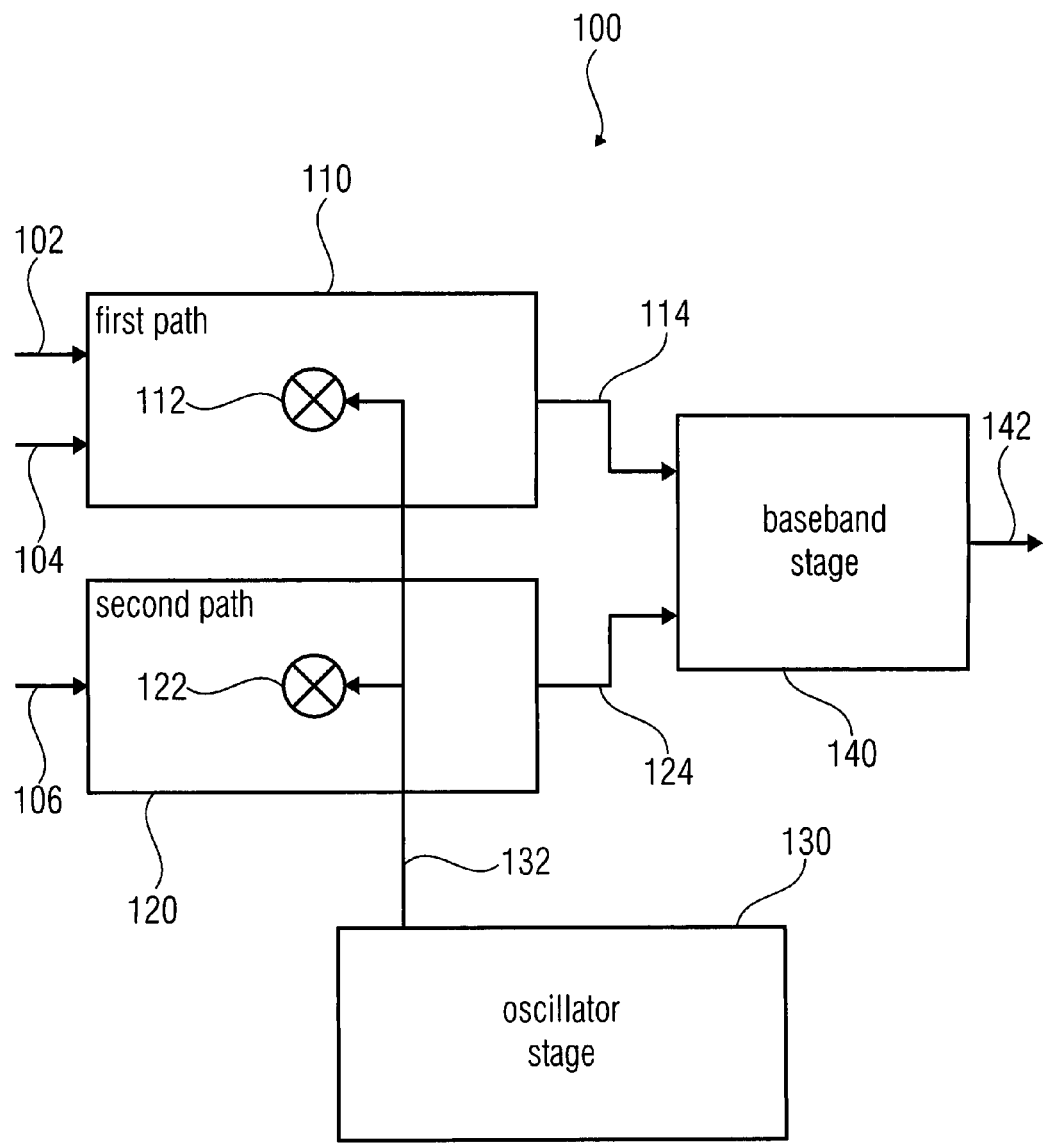
FIG. 1 shows a block diagram of a multi-frequency band receiver.

FIG. 1 shows a block diagram of a multi-frequency band receiver 100 in accordance with an embodiment of the invention. The receiver 100 comprises a first path 110 for processing a first frequency band 102 and a second frequency band 104, and a second path 120 for processing a third frequency band 106. The first frequency band 102 and the second frequency band 104 have a smaller distance than the first frequency band 102 and the third frequency band 106, and a smaller distance than the second frequency band 104 and the third frequency band 106. In addition, the receiver comprises an oscillator stage 130 for providing a local oscillator signal 132. The frequency of the local oscillator signal 132 is between the center frequency of the first frequency band 102 and the center frequency of the second frequency band 104. In addition, the first path 110 and the second path 120 each have one mixer 112, 122, it being possible for both mixers 112, 122 to be supplied with the same local oscillator signal 132. In addition, the receiver 100 comprises a baseband stage 140 serving to process output signals 114 of the first path 110 and output signals 124 of the second path 120 so as to obtain a receive signal 142.

Due to the fact that frequency bands having a small distance are processed in the same signal processing path, and that frequency bands having a large distance are processed separately in different signal processing paths, the useful bandwidth for each individual path may be kept small, which reduces the current consumption, for example. In addition, the requirements placed upon the components—as compared to a receiver having only one processing path for all of the frequency bands—may be reduced, since components having smaller bandwidths may be used for the individual paths, which also results in a cost reduction.

In addition, the receiver 100 may have to be configured such that only one oscillator stage 130 and one baseband stage 140 may be used, whereby the number of components that may be used is reduced.

Figure 2:
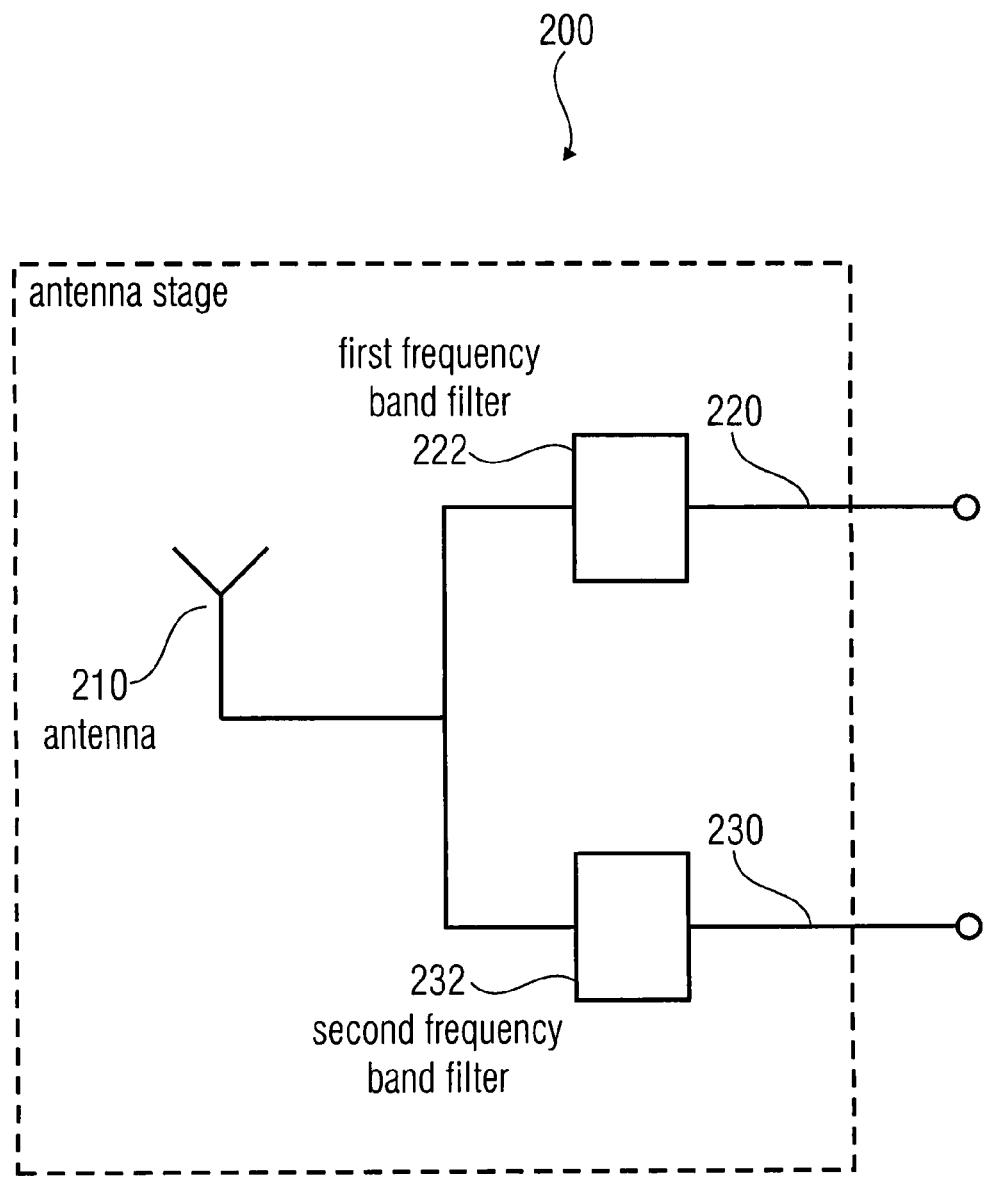
FIG. 2 shows a block diagram of an antenna stage of a multi-frequency band receiver.

FIG. 2 shows a block diagram of an antenna stage 200 of a multi-frequency band receiver in accordance with an embodiment of the invention. The antenna stage 200 comprises an antenna 210, a first output branch 220 and a second output branch 230. The first output branch 220 comprises a first frequency band filter 222, and the second output branch 230 comprises a second frequency band filter 232. The first frequency band filter 222 is configured for a frequency range comprising the first frequency band 102 and the second frequency band 104, and the second frequency band filter 232 is configured for a frequency range comprising the third frequency band 106. The first frequency band 102 and the second frequency band 104 do not lie within the upper and lower cutoff frequencies of the second frequency band filter 232. Similarly, the third frequency band 106 does not lie within the upper and lower cutoff frequencies of the first frequency band filter 222.

Due to the above-described matching of the cutoff frequencies of the frequency band filters 222, 232, it is possible to make available, at the output of the first output branch 220, signals of the first frequency band 102 and of the second frequency band 104, but not the signals of the third frequency band 106. Accordingly, at the output of the second output branch 230, signals of the third frequency band 106 may be made available, but not the signals of the first frequency band 102 and of the second frequency band 104.

Figure 3:
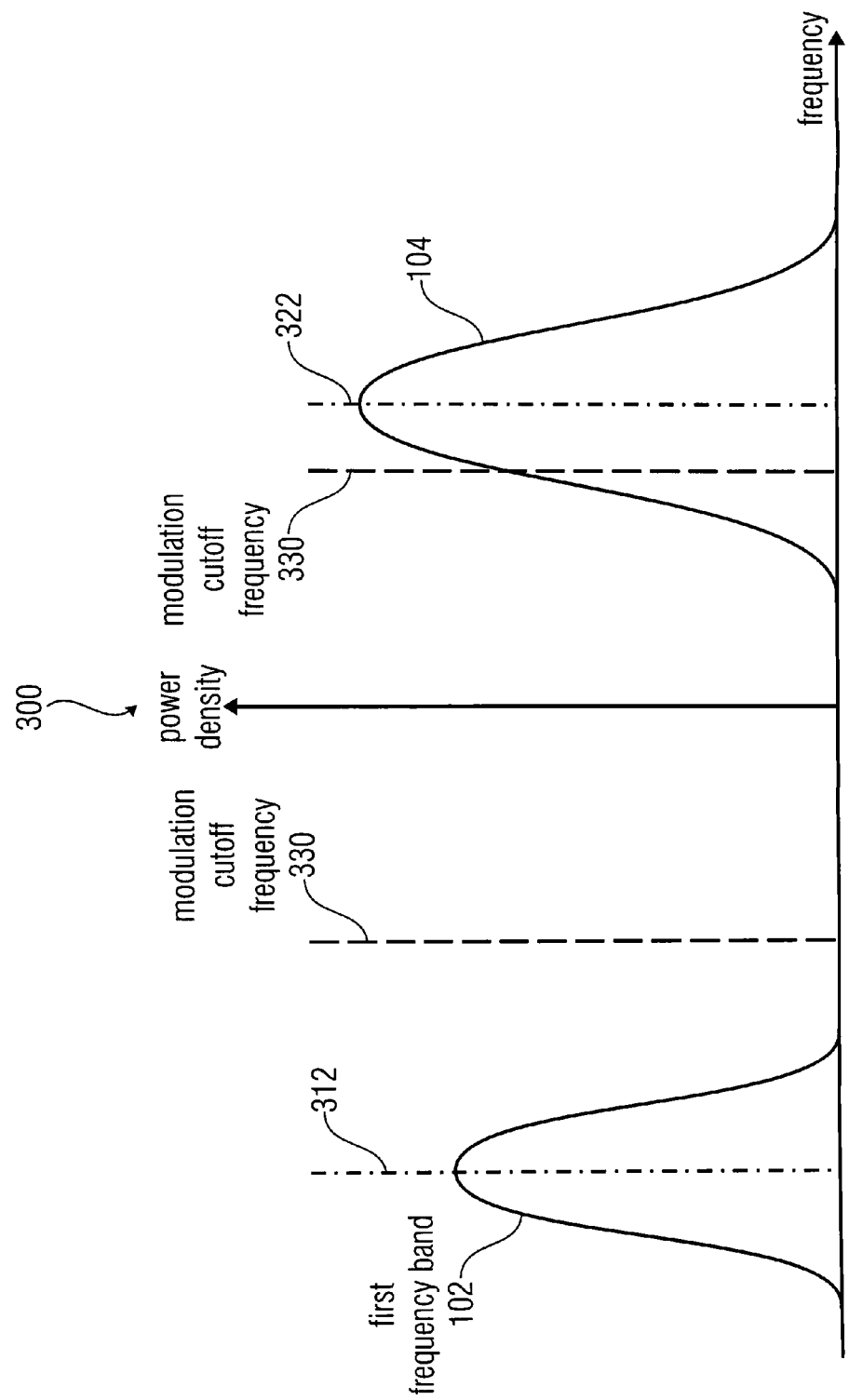
FIG. 3 shows a schematic representation of a power density/frequency diagram of signals.

FIG. 3 shows a schematic representation of a power density/frequency diagram 300 of signals as may occur, for example, in the first frequency band 102 and in the second frequency band 104. The diagram 300 shows a possible frequency spectrum of the first frequency band 102 and of the second frequency band 104, which may be modulated such that at least 50%, advantageously, however, more than 90%, of the modulated power of each of both frequency bands is within a frequency range whose absolute value is higher than a value of a modulation cutoff frequency 330. The dash-dotted line 312 in the area of the first frequency band 102 marks a frequency at which 50% of the modulated power of the first frequency band 102 lies within a range of higher frequencies, and 50% of the modulated power of the first frequency band 102 lies within a range of lower frequencies.

Accordingly, the second dash-dotted line 322 in the area of the second frequency band 104 marks a frequency at which 50% of the modulated power of the second frequency band 104 lies within a range of higher frequencies and 50% of the modulated power of the second frequency band 104 lies within a range of lower frequencies. By way of example, the dotted lines mark a value of a modulation cutoff frequency 330.

In some embodiments of the invention, in case of the existence of a frequency spectrum as is shown in FIG. 2, a highpass filter having a highpass cutoff frequency which corresponds to the modulation cutoff frequency 330 may be used for suppressing any interferences, such as 1/f noise or a DC (direct voltage) offset. For example, by means of an inventive selection of the frequency of the local oscillator signal which supplies the mixer 112 in the first path 110, a frequency spectrum as is shown in FIG. 3 may be generated, and, accordingly, a highpass filter in the described form may be employed.

Figure 4:
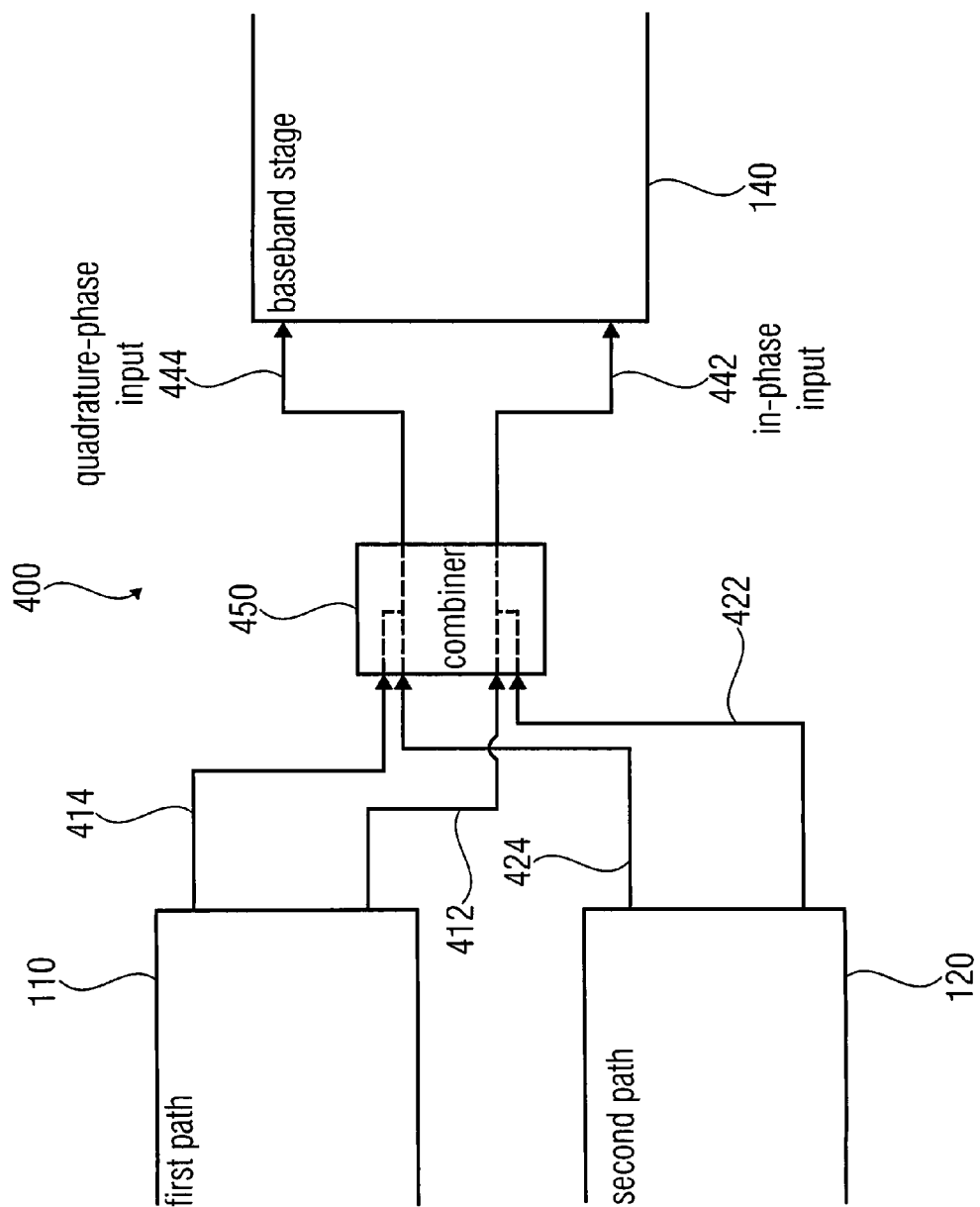
FIG. 4 shows a schematic representation of an interface between the first path and the second path on the one side, and of the baseband stage on the other side of a multi-frequency band receiver.

FIG. 4 shows a schematic representation of an interface 400 between the first path 110 and the second path 120 on the one side, and the baseband stage 140 on the other side, of a multi-frequency band receiver in accordance with an embodiment of the invention. The interface 400 comprises a combiner 450, which superimposes an output signal of the first path 110 with an output signal of the second path 120 and provides the superposition as an input signal to the baseband stage 140. For example, the first path 110, the second path 120 and the baseband stage 140 may be configured in in-phase quadrature-phase architecture. To this end, the first path 110 and the second path 120 comprise one in-phase output 412, 422 and one quadrature-phase output 414, 424, respectively, and the baseband stage 140 comprises one in-phase input 442 and one quadrature-phase input 444. The combiner 450 superimposes signals of the in-phase output 412 of the first path 110 with signals of the in-phase output 422 of the second path 120, and makes the superimposed signals available to the baseband stage 140 at the in-phase input 442 thereof. Accordingly, the combiner 450 superimposes signals of the quadrature-phase output of the first path 110 with signals of the quadrature-phase output of the second path 120 and makes the superimposed signals available to the baseband stage 140 at the quadrature-phase input 444 thereof. The signals at the outputs 412, 414 of the first path 110 and signals at the outputs 422, 424 of the second path 120 are configured such that the information of the individual signals may be separated again despite the superposition. This may be ensured, for example, by the in-phase quadrature-phase architecture. In addition, the signals in the different frequency bands may be modulated by means of time-division multiplexing (TDMA), frequency-division multiplexing (FDMA), or code-division multiplexing (CDMA). They enable that the information of the different signals are not separated before a digital portion of the baseband stage 140 or a digital portion of a subsequent component.

Figure 5:
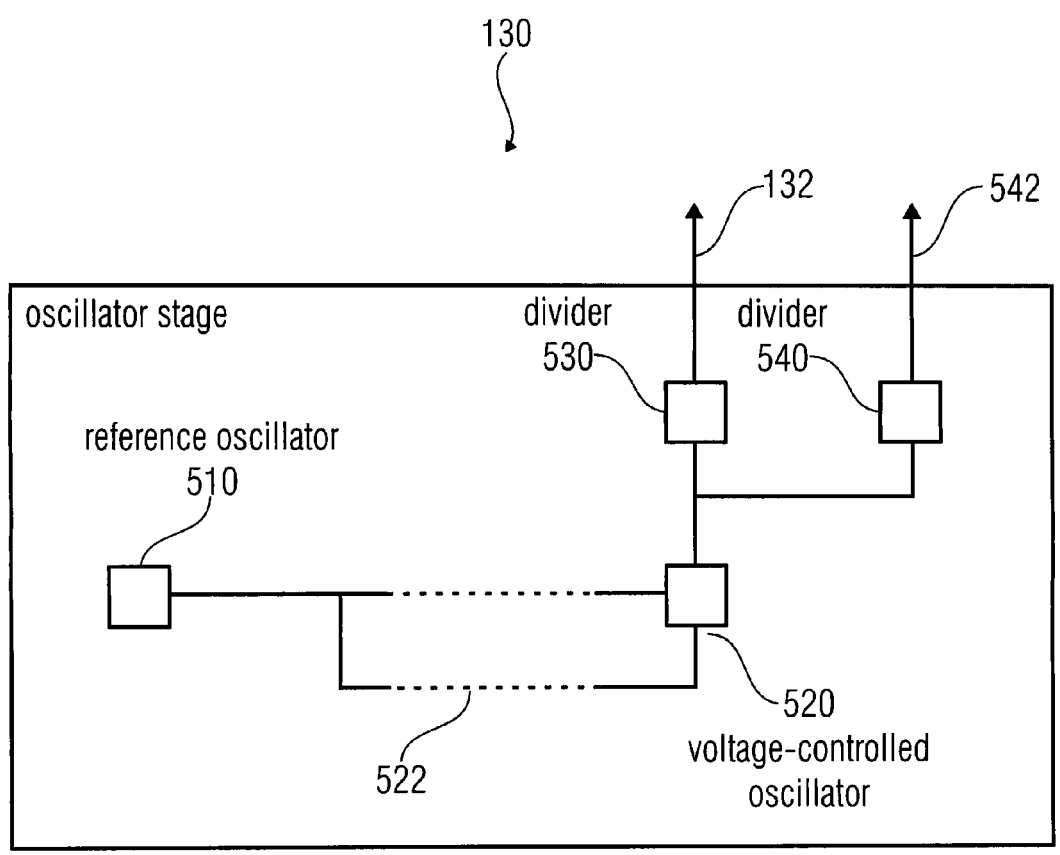
FIG. 5 shows a block diagram of an oscillator stage of a multi-frequency band receiver.

FIG. 5 shows a block diagram of an oscillator stage 130 of a multi-frequency band receiver in accordance with an embodiment of the invention. The oscillator stage 130 comprises precisely one reference oscillator 510 and precisely one voltage-controlled oscillator 520, which may be controlled by a phase-locked loop 522. The voltage-controlled oscillator 520 provides a basic oscillator signal, from which a local oscillator signal 132 may be produced, for example, by a divider 530. In addition, a further local oscillator signal 542 may be produced from the basic oscillator signal by a further divider 540.

By tuning the frequencies of the reference oscillator 510 and of the voltage-controlled oscillator 520 to the frequency range of the frequency bands to be processed by the multi-frequency band receiver, the multi-frequency band receiver may make do with only one oscillator stage in accordance with the principle described here. This one oscillator stage 130 may then provide all of the oscillator signals that may be used for the multi-frequency band receiver.

Figures 6, 6A:
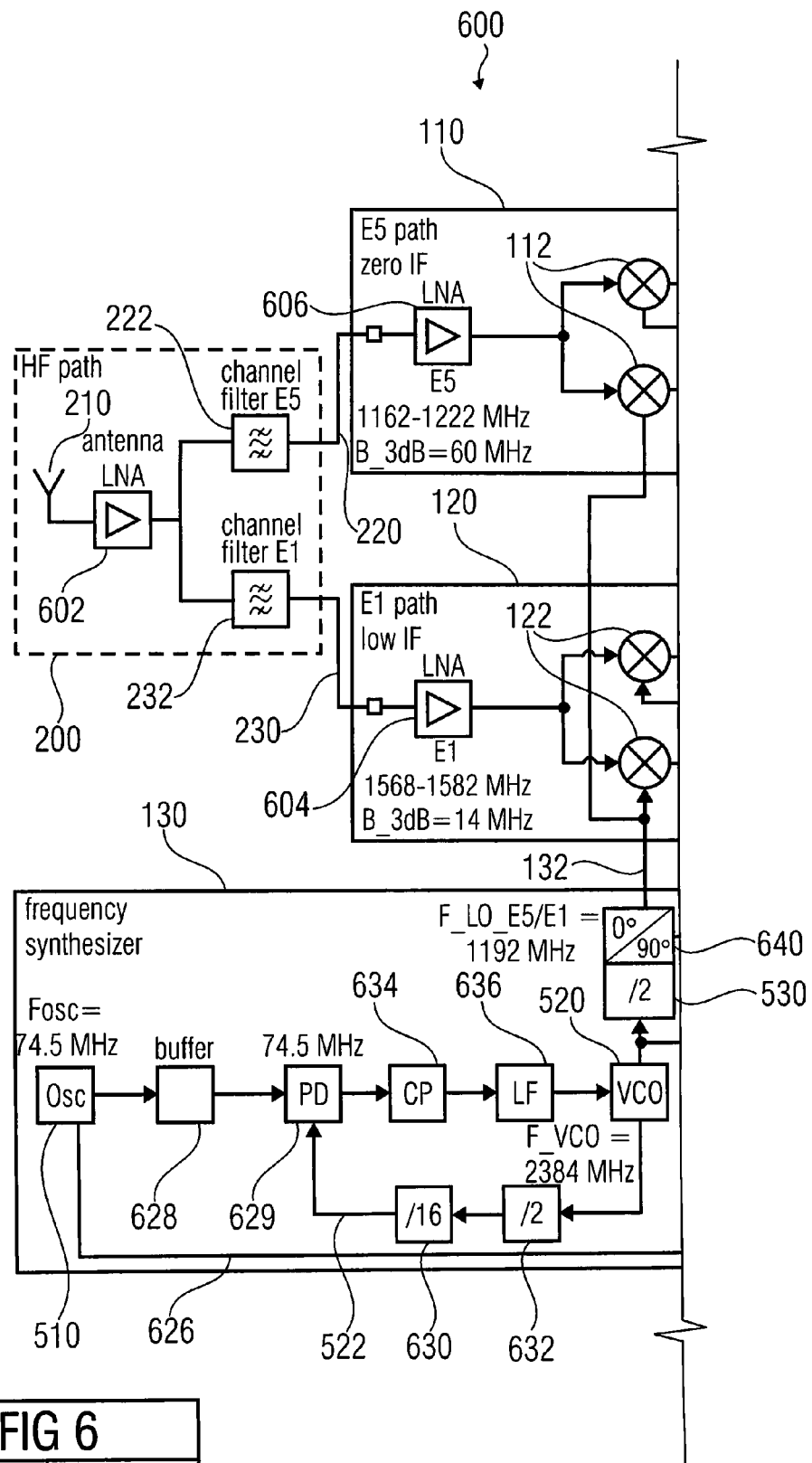
FIG. 6*a*, 6*b* shows a block diagram of a multi-frequency band receiver.
Figure 6B:
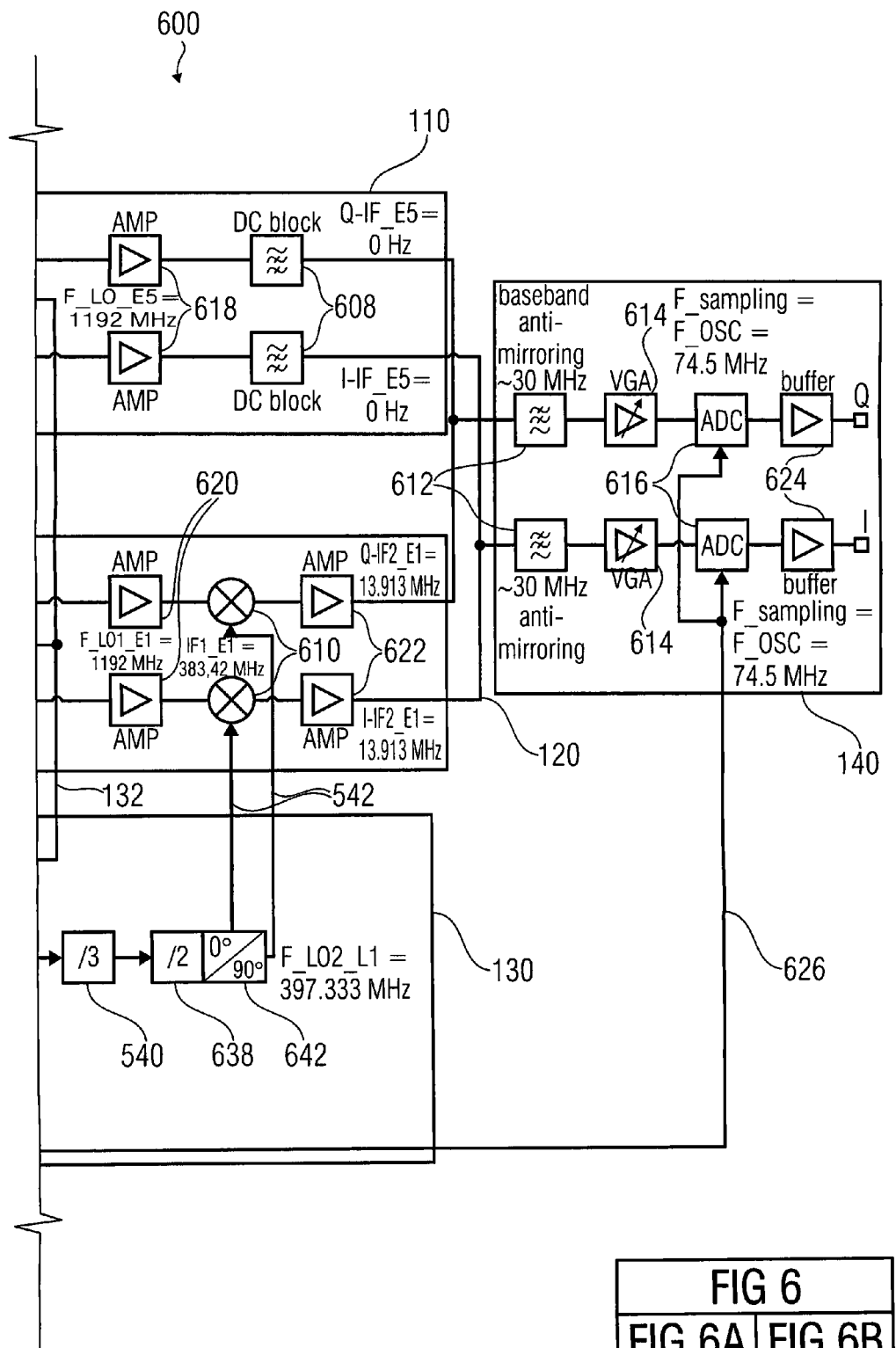

FIG. 6 shows a block diagram of a multi-frequency band receiver 600 in accordance with an embodiment of the invention. By way of example, the embodiment indicates values for the different frequency bands as occur in the "Galileo" GNSS. The first frequency band 102 is represented by the frequency band E5a, the second frequency band 104 is represented by the frequency band E5b, and the third frequency band 106 is represented by the frequency band E1. The multi-frequency band receiver 600 described may also be matched to other frequency bands, however. In this embodiment, the HF (high-frequency) path, and/or the antenna stage 200, consists of an antenna 210 having a broadband, low-noise amplifier (LNA) 602 and frequency band filters 222, 232. For a low overall noise figure of the receiver, and to reduce the noise-figure requirement placed upon the input stage, or front end (front end: input-side component), it is useful to have an LNA 602 directly at the antenna 210. This is followed by two frequency band filters 222, 232 for, e.g., E1 (center frequency 1,575.42 MHz; 14 MHz 3 dB bandwidth) and E5a/b (center frequency 1,191.795 MHz and 51 MHz 3 dB bandwidth).

Since a shared LNA for E1 and E5a/b would have to be very broadband, which would result in high power consumption, it is also possible to use e.g. an LNA 604 for E1 and an LNA 606 for E5a/b, respectively, instead.

Figure 7:
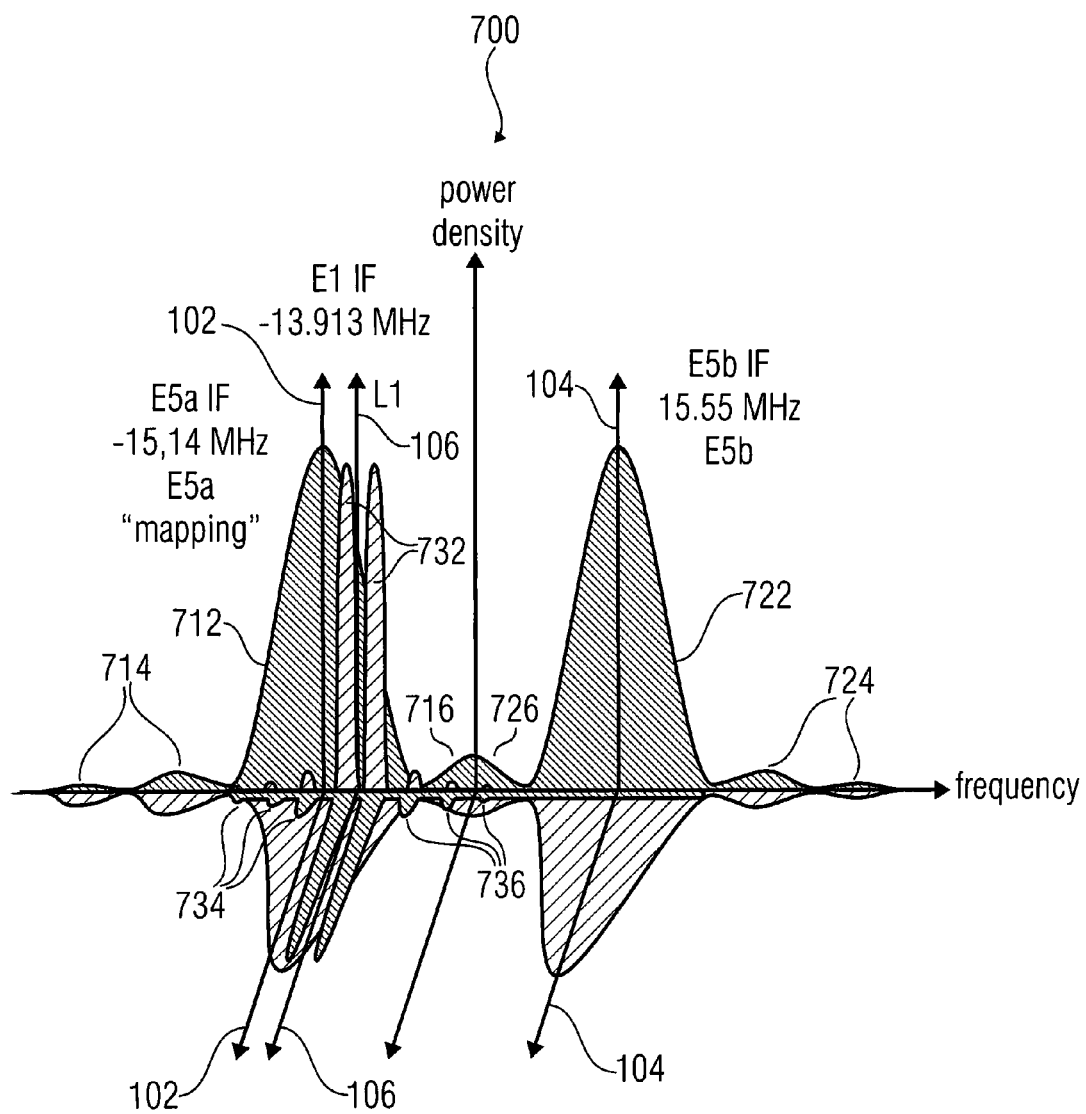
FIG. 7 shows a schematic representation of a power density/frequency diagram, or a power density spectrum, of a complex baseband signal.

A first path 110, or E5 path, is configured as a "zero-IF" (zero-IF: zero intermediate frequency) architecture. The local oscillator (LO) 132 having, e.g., 1,192 MHz is arranged centrally between the frequency bands E5a and E5b. Thus, E5a is, as a mirror frequency of E5b, within the same baseband range. An in-phase quadrature-phase mixer 112 is employed, for example. By means of, e.g., an AltBOC (Alternating Binary Offset Carrier) modulation in the "Galileo" E5 frequency band, hardly any useful signal power is contained within the baseband spectrum around 0 to 5 MHz, which is indicated in FIG. 7, for example. This is why said frequencies are filtered with a highpass 608 (DC block, direct current block). As a result, the typical interfering low-IF (low intermediate frequency) effects such as 1/f noise and DC (direct current) offset, for example, may be eliminated without the useful signal being noticeably degraded.

In the second path 120, or E1 path, the HF (high frequency) signal is initially mixed using the same local oscillator frequency 132 as in the first path 110, or E5 path, and is thus converted to a first intermediate frequency (IF) of about 383.42 MHz. Mirror-frequency suppression is effected by the E1 frequency band filter 232. Starting from this first intermediate frequency, or IF, the baseband low IF of 13.91 MHz is followed by a further frequency conversion at a local oscillator frequency 542 (LO frequency) of, e.g., 397.33 MHz. Both mixers 122, 610 are again configured in in-phase and quadrature-phase architecture.

In the shared baseband, the in-phase and quadrature-phase branches of the E1 and E5 paths, respectively, are joined and additively superimposed, for example. The complex baseband is depicted in FIG. 7, for example. This is followed by an anti-aliasing lowpass filter 612 (anti-aliasing: anti-mirroring) at a cutoff frequency of about 30 MHz. Subsequently, both paths are conditioned by a variable gain amplifier (VGA) 614, and are sampled using an analog-to-digital converter (ADC) 616. The ADC sampling frequency may be tapped directly from the quartz frequency, or from the frequency of the reference oscillator 510.

All of the useful local oscillator frequencies 132, 542 for the mixers 112, 122, 610 of the E5 and E1 paths are derived from the same frequency synthesizer and/or the same oscillator stage 130. The E5 local oscillator frequency (also referred to as F_LO_E5) in FIG. 6) corresponds to the first E1 local oscillator frequency (also referred to as F_LO1_E1 in FIG. 6). The second E1 local oscillator frequency (also referred to as F_LO2_E1 in FIG. 6) is, e.g., exactly one third of the first one and may thus be generated by a simple digital frequency divider 540. By means of this frequency selection, the frequency synthesizer or the oscillator stage 130 of the phase-locked loop (PLL) 522 may be constructed in a simple and low-power manner. In addition, it is possible to configure the frequency divider such that, e.g., only digital "divided by two" dividers may be used, which may be easily integrated and consume little power.

In addition to the components already described, the first path 110, or E5 path, has one amplifier 618 in the in-phase branch and quadrature-phase branch, respectively, downstream from the mixer 112 in the signal processing direction. Likewise, the second path 120, or E1 path, has one amplifier 620, 622, in the in-phase branch and quadrature-phase branch, respectively, upstream from each of both mixers 122, 610. The amplifiers 618, 620, 622 may be configured as amplifiers having variable gain factors, for example, so as to be able to adapt the power levels between the first path 110 and the second path 120, for example.

In addition, the baseband stage 140 comprises, in the in-phase and quadrature-phase branches, one buffer 624, respectively, which is arranged downstream from the analog-to-digital converters 616 in the signal processing direction.

The oscillator stage 130, or the frequency synthesizer, provides all of the useful oscillator signals 132, 542. To this end, the oscillator stage 130 comprises a reference oscillator 510 which has a frequency of, e.g., 74.5 MHz and whose reference oscillator signal 626 may be directly used for controlling the analog-to-digital converters 616 in the baseband stage. Additionally, the reference oscillator 510 is connected to a buffer 628 from which the reference oscillator signal is forwarded to a phase detector 629 which is part of a phase-locked loop 522 of a voltage-controlled oscillator 520. The oscillator signal of the voltage-controlled oscillator 520, which previously was divided by 32 (as is indicated in FIG. 6 by the two dividers 630, 632), is present at a second input of the phase detector 629. Downstream from the phase detector 629, a charge pump (CP) 634 and a loop filter 636 are arranged which provide a signal with which the voltage-controlled oscillator 520 is controlled. The voltage-controlled oscillator 520 provides a basic oscillator signal having a frequency of, e.g., 2,384 MHz. Starting from this basic frequency, the first local oscillator signal 132 (F_LO_E5, F_LO1_E1) having a frequency of, e.g., 1,192 MHz may be produced, on the one hand, by a "divided by two" divider 530; on the other hand, starting from the base oscillator signal, the basic oscillator frequency may be divided by six (as is indicated in FIG. 6 by the two dividers 540, 638) in another branch, and thus the second local oscillator signal 542 (F_LO2_E1) having a frequency of, e.g., 397.33 MHz may be produced. Both local oscillator signals 132, 542 may be made available, by the oscillator stage 130, or the frequency synthesizer, for the in-phase quadrature-phase mixers 112, 122, 610 as an in-phase signal and as a signal shifted in phase by 90°, for example (as is shown in FIG. 6 by the two phase-shifting units 640, 642).

In the oscillator stage 130 shown in FIG. 6, or in the frequency synthesizer represented, the "divided by 2" dividers 530, 632, 638 may be saved when using a voltage-controlled oscillator 520 which has a basic frequency that is halved accordingly. However, this is only useful when a low-cost voltage-controlled oscillator 520 of sufficient quality is available, and when phase-shifting is achieved differently for the phase-shifted local oscillator signal.

The complex baseband signal shown in FIG. 7, for example, may be separated again in the digital domain due to the in-phase quadrature-phase conversion performed. However, further processing is possible also without such a separation in the case of, e.g., direct sequence spread spectrum (DSSS) signals, e.g. of the "Galileo" GNSS. For example, the signal sought for may be obtained with the aid of a cross-correlation function. The superimposed signal here behaves as almost pure white noise. Due to the high spreading factor of the DSSS signals, the additional noise may be easily compensated for.

The multi-frequency band receiver shown in FIG. 6 may be used as a three-frequency band "Galileo" GNSS receiver, for example.

Some embodiments of the invention represent an input architecture, or front-end architecture, which has a minimum number of components for a high-precision GNSS multi-frequency band receiver. For example, the three "Galileo" GNSS frequency bands (E1, E5a and E5b) may thus be received at the same time. With corresponding matching of the frequencies, this architecture may also be employed, for example, for frequency bands of other GNSS (such as "Naystar" or "Compass", for example) or for simultaneous reception of frequency bands from different systems. The low number of components that may be used enables compact and low-power integration.

Further embodiments of the invention enable reception of, e.g., the Galileo frequency bands E1, E5a, and E5b at the same time. The maximum HF bandwidth that may be used may be as small as about 60 MHz. The baseband bandwidth that is eventually sampled is below 30 MHz. By means of an inventive configuration of the frequency synthesizer or the oscillator stage, and its utilization, as well as by means of superimposing the three frequency bands in the baseband, the expenditure for the receiver in terms of space, cost and power may be minimized. A highly integrated, compact solution with low power consumption is therefore possible.

Some embodiments of the invention represent an input architecture, or front-end architecture, for a "Galileo" GNSS three-frequency band receiver (E1, E5a, and E5b) and therefore may use fewer components as would be the case for two or three independent receivers.

Further embodiments of the invention may use only one frequency synthesizer, or oscillator stage, from which all of the useful frequencies may easily be derived. In addition, the frequency divider may be constructed by simple digital "divided by two" units.

In some embodiments of the invention, mirror-frequency suppression may be completely dispensed with in both paths. In the first path, or E5 path, the mirror frequency is actually utilized, in the second path, or E1 path, mirror-frequency suppression is ensured already by the previous E1 band filter at the antenna in the HF path.

In further embodiments of the invention, the substantial disadvantages of low-IF architecture such as a DC (direct current) offset or 1/f noise may be eliminated, e.g., by a highpass in the E5 baseband range without noticeably losing information in the useful signal, since, e.g., the "Galileo" E5 band is AltBOC (15, 10) modulated.

Some embodiments of the invention may make do with only one ADC in the baseband for all of the three frequency bands, respectively, due to, e.g., additive superposition of the in-phase and quadrature-phase paths.

In further embodiments of the invention, the improvements mentioned enable, for example, developing a highly integrated receiver for the three "Galileo" frequency bands E1, E5a and E5b which may use only a minimum number of components and at the same time can be efficient in terms of space, cost, and power consumption.

For highly accurate navigation, interferences caused by the ionosphere, for example, may be corrected. In this context, it is indispensable to have at least two different frequency bands.

FIG. 7 shows a schematic representation of a power density/frequency diagram, or a power density spectrum, of a complex baseband signal as may occur, for example, in a multi-frequency band receiver as is shown in FIG. 6. In the upward direction the diagram 700 shows the in-phase component of the power density, and in the downward direction it shows the quadrature-phase component of the power density, the in-phase component of the first frequency band 102 and of the second frequency band 104 being depicted as black areas, and the in-phase component of the third frequency band 106 being depicted as hatched areas. Conversely, the quadrature-phase components of the first frequency band 102 and of the second frequency band 104 are depicted as hatched areas, and the quadrature-phase component of the third frequency band 106 is depicted as a black area.

In addition to the main maximum 712, the first frequency band 102 also has, adjacently to the main maximum 712, two additional maxima 714 on the left-hand side, and one additional maximum 716 on the right-hand side. In a mirror-inverted manner, the second frequency band 104 has, adjacently to a main maximum 722, two additional maxima 724 on the right-hand side, and one additional maximum 726 on the left-hand side. In this example, the third frequency band 106 has two main maxima 732 with three additional maxima 734 on the right-hand side and three additional maxima 736 on the left-hand side, respectively.

By means of inventive selection of the frequency of the local oscillator signal 132, the first frequency band 102, or E5a, in the baseband is around a frequency of −15.14 MHz, and the second frequency band 104, or E5b, in the baseband is around a frequency of 15.55 MHz. The first frequency band 102, or E5a, is also present as a mirror frequency of the second frequency band 104, or E5b, and therefore, mirror-frequency suppression is not necessary for these two frequency bands. In this example, the third frequency band 106, or E1, in the baseband is around a frequency of −13.913 MHz. By modulating the frequency bands using, e.g., time-division multiplexing (TDMA), frequency-division multiplexing (FDMA), or code-division multiplexing (CDMA), the signals of the different frequency bands may be easily separated.

Figure 8:
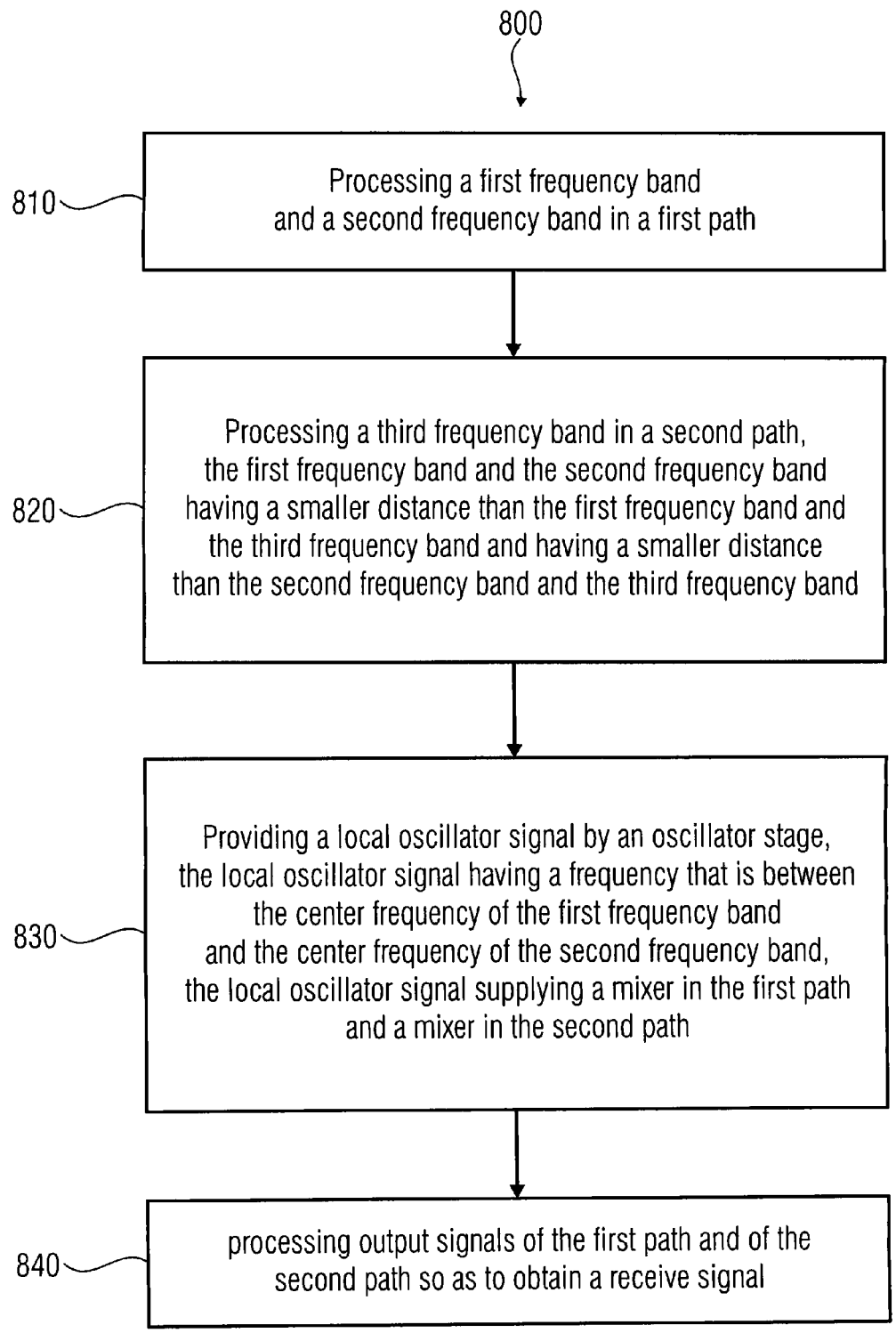
FIG. 8 shows a flow chart of a method of receiving signals using a multi-frequency band receiver.

FIG. 8 shows a flowchart of a method 800 of receiving signals using a multi-frequency band receiver in accordance with an embodiment of the invention. The method 800 comprises processing 810 a first frequency band 102 and a second frequency band 104 in a first path 110 and processing 820 a third frequency band 106 in a second path 120, the first frequency band 102 and the second frequency band 104 having a smaller distance than the first frequency band 102 and the third frequency band 106, and having a smaller distance than the second frequency band 104 and the third frequency band 106. In addition, the method comprises providing 830 a local oscillator signal 132 by an oscillator stage 130, the local oscillator signal 132 having a frequency that lies between the center frequency of the first frequency band 102 and the center frequency of the second frequency band 104, the local oscillator signal 132 supplying a mixer 112 in the first path 110 and a mixer 122 in the second path 120. This is followed by processing 840 of output signals 114, 124, of the first path 110 and of the second path 120 so as to obtain a receiver signal 142.

Figure 9:
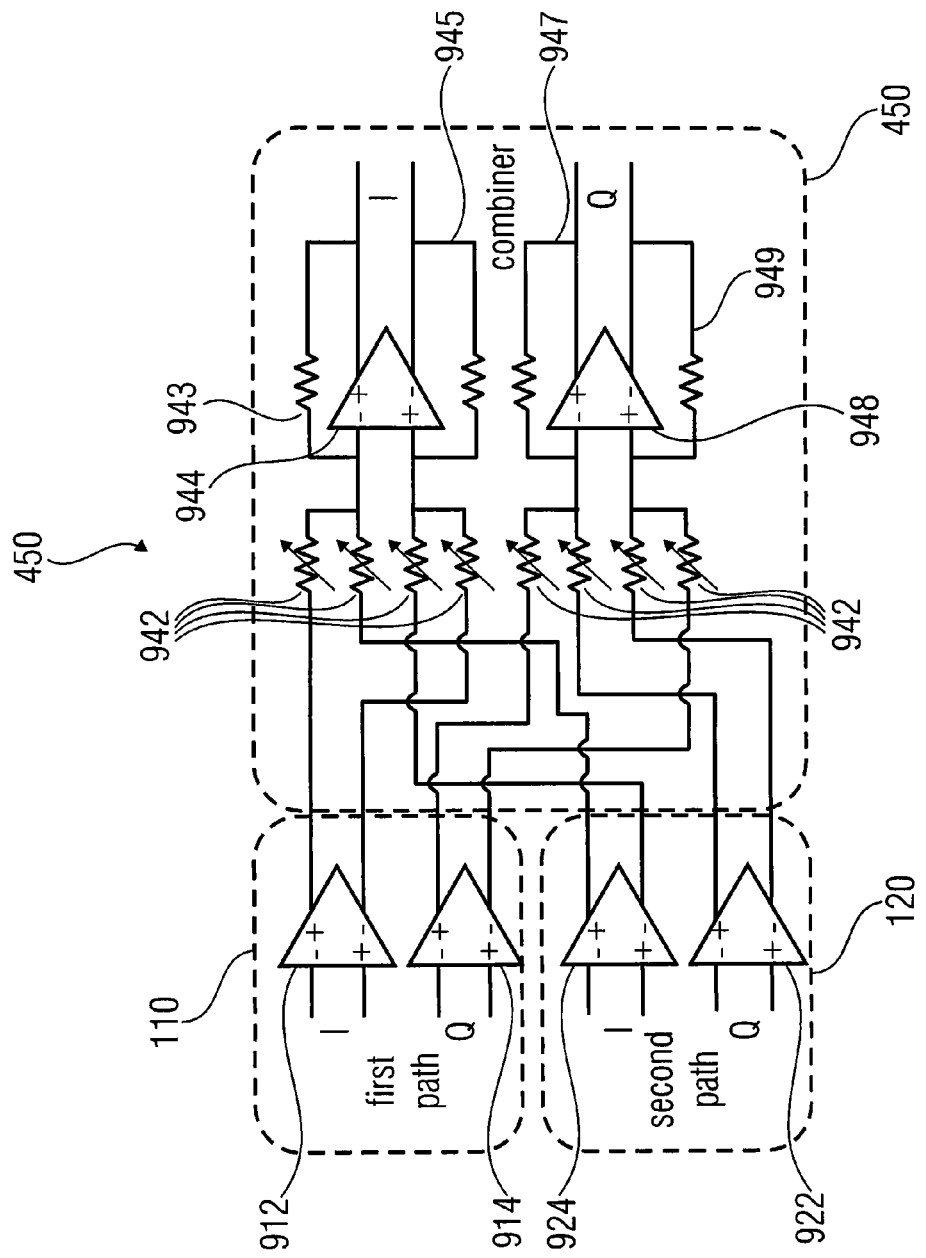
FIG. 9 shows a block diagram of a combiner of a multi-frequency band receiver.

FIG. 9 shows a block diagram of a combiner 450 of a multi-frequency band receiver in accordance with an embodiment of the invention. The combiner 450 is configured in a differential design. Correspondingly, FIG. 9 depicts a potential differential configuration of the outputs of the first path 110 and of the second path 120. The outputs of the first path 110 and of the second path 120 have a differential amplifier 912, 914, 922, 924 for an in-phase branch I and a quadrature-phase branch Q, respectively. Each differential amplifier comprises an output for a signal and the inverted signal.

The combiner 450 comprises an adder circuit having a first differential amplifier 944, and an adder circuit having a second differential amplifier 948. The non-inverted in-phase output of the first path 110 and the non-inverted in-phase output of the second path 120 are each connected to a first input of the first differential amplifier 944 via one adjustable resistor 942, respectively. The inverted in-phase output of the first path 110 and the inverted in-phase output of the second path 120 are each connected to a second input of the first differential amplifier 944 via one adjustable resistor 942, respectively.

In addition, the non-inverted quadrature-phase output of the first path 110 and the non-inverted quadrature-phase of the second path 120 are each connected to a first input of the second differential amplifier 948 via one adjustable resistor 942, respectively. The inverted quadrature-phase output of the first path 110 and the inverted quadrature-phase output of the second path 120 are each connected to a second input of the second differential amplifier 948 via one adjustable resistor 942, respectively.

In the first differential amplifier 944 and the second differential amplifier 948, the non-inverted output, respectively, is connected to the inverting input via a resistive feedback 943, 947, and the inverted output, respectively, is connected to the non-inverting input via a resistive feedback 945, 949.

The combiner 450 is designed to provide a superimposed in-phase output signal I and a superimposed quadrature-phase output signal Q of the signals of the first path 110 and of the signals of the second path 120.

Generally, it is to be stated that the medium frequency $f_0$ of a frequency band is defined as the geometric mean between the lower cutoff frequency $f_1$ and the upper cutoff frequency $f_2$ of the frequency band.

$$f_0 = \sqrt{f_1 f_2}$$

Frequencies referred to as cutoff frequencies are such frequencies wherein an output value of an output quantity, such as a power of a voltage, has decreased by 3 dB. The arithmetic mean may also be used.

It shall be noted, in particular, that depending on the conditions, the inventive scheme may also be implemented in software. Implementation may be effected on a digital storage medium, in particular a disc or a CD having electronically readable control signals which may cooperate with a programmable computer system such that the corresponding method is performed. Therefore, the invention generally also consists in a computer program product having a program code, stored on a machine-readable carrier, for performing the inventive method, when the computer program product runs on a computer. In other words, the invention may therefore be realized as a computer program having a program code for performing the method, when the computer program product runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A multi-frequency band receiver, comprising:
a first path configured to process a first frequency band and a second frequency band;
a second path configured to process a third frequency band, the first frequency band and the second frequency band exhibiting a smaller distance than the first frequency band and the third frequency band, and exhibiting a smaller distance than the second frequency band and the third frequency band;
an oscillator stage for providing a local oscillator signal comprising a frequency that is between the center frequency of the first frequency band and the center frequency of the second frequency band, the first path comprising a mixer that is supplied with the local oscillator signal, and the second path comprising a mixer that is supplied with the local oscillator signal;
a baseband stage for processing output signals of the first path and output signals of the second path so as to acquire a receive signal,
wherein the first path comprises an in-phase output and a quadrature-phase output, wherein the second path comprises an in-phase output and a quadrature-phase output, and wherein the baseband stage comprises an in-phase input and a quadrature-phase input; and
a combiner configured to superimpose a signal at the in-phase output of the first path and a signal at the in-phase output of the second path and to make said signal available to the baseband stage at the in-phase input,
and the combiner being configured to superimpose a signal at the quadrature-phase output of the first path and a signal at the quadrature-phase output of the second path and to make said signal available to the baseband stage at the quadrature-phase input.

2. The multi-frequency band receiver as claimed in claim 1, further comprising:
an antenna stage comprising an antenna, a first output branch and a second output branch, the first output branch comprising a first frequency band filter for a frequency range comprising the first frequency band and the second frequency band, and the second output branch comprising a second frequency band filter for a frequency range comprising the third frequency band, the first frequency band and the second frequency band not lying within the upper and lower cutoff frequencies of the second frequency band filter, and the third frequency band not lying within the upper and lower cutoff frequencies of the first frequency band filter.

3. The multi-frequency band receiver as claimed in claim 1, wherein the oscillator stage is configured to provide a local oscillator signal which comprises a frequency that corresponds to the arithmetic mean of the medium frequencies of the first frequency band and to the medium frequency of the second frequency band, with a tolerance of +/−10% of the absolute value of the difference between the medium frequency of the first frequency band and the medium frequency of the second frequency band.

4. The multi-frequency band receiver as claimed in claim 1, wherein a signal in the first frequency band and a signal in the second frequency band comprise a modulation configured such that more than 50% of a modulated power of each of both frequency bands lies within a frequency range comprising frequencies whose absolute values are larger than a value of a modulation cutoff frequency, and wherein the first path comprises a highpass filter connected to an output of the first path which comprises a highpass cutoff frequency that is equal to the modulation cutoff frequency.

5. The multi-frequency band receiver as claimed in claim 1, wherein the mixer in the first path and the mixer in the second path are configured as in-phase quadrature-phase mixers, the oscillator stage being configured to provide the local oscillator signal such that the local oscillator signal comprises an in-phase component and a quadrature-phase component which is supplied to the in-phase quadrature-phase mixer in the first path and to the in-phase quadrature-phase mixer in the second path.

6. The multi-frequency band receiver as claimed in claim 1, wherein signals at the outputs of the first path and signals at the outputs of the second path are configured such that the information of the individual signals are separated again despite the superposition.

7. The multi-frequency band receiver as claimed in claim 1, wherein a signal in the first frequency band, a signal in the second frequency band and a signal in the third frequency band are modulated by means of time-division multiplexing, frequency-division multiplexing, or code-division multiplexing.

8. The multi-frequency band receiver as claimed in claim 1, wherein the second path comprises a further mixer which is arranged between the first mixer and the outputs of the second path, and which receives a second local oscillator signal, the frequency of the second local oscillator signal exhibiting a value such that the difference between the frequency of the second local oscillator signal and an intermediate frequency yields a value of a frequency that is within a baseband, said baseband comprising a frequency band for which the baseband stage is adapted, and the intermediate frequency comprising a value that is within the difference between the first local oscillator signal and the upper cutoff frequency of the third frequency band and the difference between the first local oscillator signal and the lower cutoff frequency of the third frequency band.

9. The multi-frequency band receiver as claimed in claim 1, wherein the oscillator stage comprises precisely one reference oscillator and precisely one voltage-controlled oscillator, the voltage-controlled oscillator being controlled by a phase-locked loop so as to generate a basic oscillator signal, and the oscillator stage further comprising a divider configured to generate the local oscillator signal from the basic oscillator signal, and the oscillator stage further comprising a second divider configured to generate a further local oscillator signal from the basic oscillator signal, the frequency of the further local oscillator signal differing from the frequency of the first local oscillator signal.

10. The multi-frequency band receiver as claimed in claim 9, wherein a further mixer in the second path which is arranged between the first mixer and the outputs of the second path receives the further local oscillator signal.

11. The multi-frequency band receiver as claimed in claim 9, wherein the baseband stage comprises an analog-to-digital converter, said analog-to-digital converter receives a signal of the reference oscillator.

12. The multi-frequency band receiver as claimed claim 1, wherein the baseband stage comprises, irrespective of the number of frequency bands to be processed, precisely one analog-to-digital converter in an in-phase branch and precisely one analog-to-digital converter in a quadrature-phase branch, and thus comprises a total of precisely two analog-to-digital converters.

13. The multi-frequency band receiver as claimed in claim 1, wherein the oscillator stage comprises only "divided by two" dividers and exactly one "divided by three" divider connected in a way so that the local oscillator signal is provided.

14. The multi-frequency band receiver as claimed in claim 1, wherein the baseband stage comprises only digital elements, and no analog elements, for separating the items of information of the different frequency bands.

15. The multi-frequency band receiver as claimed in claim 1, wherein in a baseband, the absolute value of the medium frequency of a frequency band representing the third frequency band in the baseband is smaller than the absolute value of the medium frequency of a frequency band representing the first frequency band in the baseband, and is smaller than the absolute value of the medium frequency of a frequency band representing the second frequency band in the baseband.

16. The multi-frequency band receiver as claimed in claim 1, comprising:
the first path configured to process the first frequency band, the first frequency band comprising a frequency of 1,176.45 MHz, and configured to process the second frequency band, said second frequency band comprising a frequency of 1,207.14 MHz;
the second path configured to process the third frequency band, said third frequency band comprising a frequency of 1,575.42 MHz;
the oscillator stage providing the local oscillator signal comprising a frequency of 1,192 MHz and the further local oscillator signal comprising a frequency of 397.33 MHz and a reference oscillator signal comprising a frequency of 74.5 MHz, the frequency of the local oscillator signal, of the further local oscillator signal and of the reference oscillator signal comprising a tolerance of 10%;
a frequency range, within a baseband, which represents the first frequency band and comprises a frequency of −15.14 MHz;
a frequency range, within the baseband, which represents the second frequency band and comprises a frequency of 15.55 MHz;
a frequency range, within the baseband, which represents the third frequency band and comprises a frequency of −13.91 MHz.

17. The multi-frequency band receiver as claimed in claim 1, wherein the first path comprises only precisely one mixer for processing the first frequency band and the second frequency band.

18. The multi-frequency band receiver as claimed in claim 1, wherein the combiner comprises a first differential amplifier for additively superimposing the in-phase component of the first path and the in-phase component of the second path, and a second differential amplifier for additively superimposing the quadrature-phase component of the first path and the quadrature-phase component of the second path, each connection between an output of the first path or of the second path and an input of a differential amplifier of the combiner comprising an adjustable resistor.

19. A satellite navigation receiver comprising a multi-frequency band receiver comprising:
a first path configured to process a first frequency band and a second frequency band;
a second path configured to process a third frequency band, the first frequency band and the second frequency band exhibiting a smaller distance than the first frequency band and the third frequency band, and exhibiting a smaller distance than the second frequency band and the third frequency band;
an oscillator stage for providing a local oscillator signal comprising a frequency that is between the center frequency of the first frequency band and the center frequency of the second frequency band, the first path comprising a mixer that is supplied with the local oscillator signal, and the second path comprising a mixer that is supplied with the local oscillator signal;
a baseband stage for processing output signals of the first path and output signals of the second path so as to acquire a receive signal,
wherein the first path comprises an in-phase output and a quadrature-phase output, wherein the second path comprises an in-phase output and a quadrature-phase output, and wherein the baseband stage comprises an in-phase input and a quadrature-phase input; and
a combiner configured to superimpose a signal at the in-phase output of the first path and a signal at the in-phase output of the second path and to make said signal available to the baseband stage at the in-phase input,
and the combiner being configured to superimpose a signal at the quadrature-phase output of the first path and a signal at the quadrature-phase output of the second path and to make said signal available to the baseband stage at the quadrature-phase input.

20. A method of receiving signals using a multi-frequency band receiver, the method comprising:
    processing a first frequency band and a second frequency band in a first path;
    processing a third frequency band in a second path, the first frequency band and the second frequency band exhibiting a smaller distance than the first frequency band and the third frequency band, and exhibiting a smaller distance than the second frequency band and the third frequency band;
    providing a local oscillator signal by an oscillator stage, said local oscillator signal comprising a frequency that lies between the center frequency of the first frequency band and the center frequency of the second frequency band, the local oscillator signal is supplied to a mixer in the first path and a mixer in the second path; and
    processing output signals of the first path and output signals of the second path by a baseband stage, so as to acquire a receive signal
    wherein the first path comprises an in-phase output and a quadrature-phase output, wherein the second path comprises an in-phase output and a quadrature-phase output, and wherein the baseband stage comprises an in-phase input and a quadrature-phase input;
    superimposing a signal at the in-phase output of the first path and a signal at the in-phase output of the second path and making said signal available to the baseband stage at the in-phase input; and
    superimposing a signal at the quadrature-phase output of the first path and a signal at the quadrature-phase output of the second path and making said signal available to the baseband stage at the quadrature-phase input.

21. A non transitory computer readable medium encoded with instructions, when executed by a processor, allow the processor to perform the method comprising:
    processing a first frequency band and a second frequency band in a first path;
    processing a third frequency band in a second path, the first frequency band and the second frequency band exhibiting a smaller distance than the first frequency band and the third frequency band, and exhibiting a smaller distance than the second frequency band and the third frequency band;
    providing a local oscillator signal by an oscillator stage, said local oscillator signal comprising a frequency that lies between the center frequency of the first frequency band and the center frequency of the second frequency band, the local oscillator signal is supplied to a mixer in the first path and a mixer in the second path; and
    processing output signals of the first path and output signals of the second path by a baseband stage, so as to acquire a receive signal,
    wherein the first path comprises an in-phase output and a quadrature-phase output, wherein the second path comprises an in-phase output and a quadrature-phase output, and wherein the baseband stage comprises an in-phase input and a quadrature-phase input;
    superimposing a signal at the in-phase output of the first path and a signal at the in-phase output of the second path and making said signal available to the baseband stage at the in-phase input; and
    superimposing a signal at the quadrature-phase output of the first path and a signal at the quadrature-phase output of the second path and making said signal available to the baseband stage at the quadrature-phase input.

* * * * *